United States Patent [19]

Showalter

[11] Patent Number: 5,268,581
[45] Date of Patent: Dec. 7, 1993

[54] BAR CODING SCHEME FOR SENSING MEDIA TYPE AND QUANTITY ON A ROTATING SUPPLY TUBE

[75] Inventor: John Showalter, Overland Park, Kans.

[73] Assignee: CalComp Inc., Anaheim, Calif.

[21] Appl. No.: 975,636

[22] Filed: Nov. 13, 1992

[51] Int. Cl.⁵ .............................................. G06K 7/10
[52] U.S. Cl. ...................................... 250/566; 235/464
[58] Field of Search ....................... 250/566, 570, 568; 235/464, 472

[56] References Cited

U.S. PATENT DOCUMENTS 3,931,524  1/1976  Herrin ................................ 235/472
4,463,251  7/1984  Koutonen et al. ................. 235/464

Primary Examiner—David C. Nelms
Assistant Examiner—K. Shami
Attorney, Agent, or Firm—Donald A. Streck; Wm. F. Porter, Jr.

[57] ABSTRACT

In a pen plotter having plotting media supplied in the form of plotting media supply rolled around a hollow tube, this is a method and apparatus for automatically identifying the type of, and measuring the amount of, plotting media contained on the plotting media supply roll. A circular barcode strip is secured to the inner surface of the supply tube and is optically scanned to reveal the identity of the media contained on the supply roll. Said barcode strip's properties allow for the determination of the rotational velocity of the supply roll which, when used in conjunction with other known and easily derivable pieces of information, also allow for the precise calculation of the amount of media remaining on the roll. Knowing the identity of the media on the roll allows the plotter to handle the media in a manner consistent with its properties. Knowing the quantity of media remaining allows both media low and media out conditions to be determined and alarmed.

27 Claims, 4 Drawing Sheets

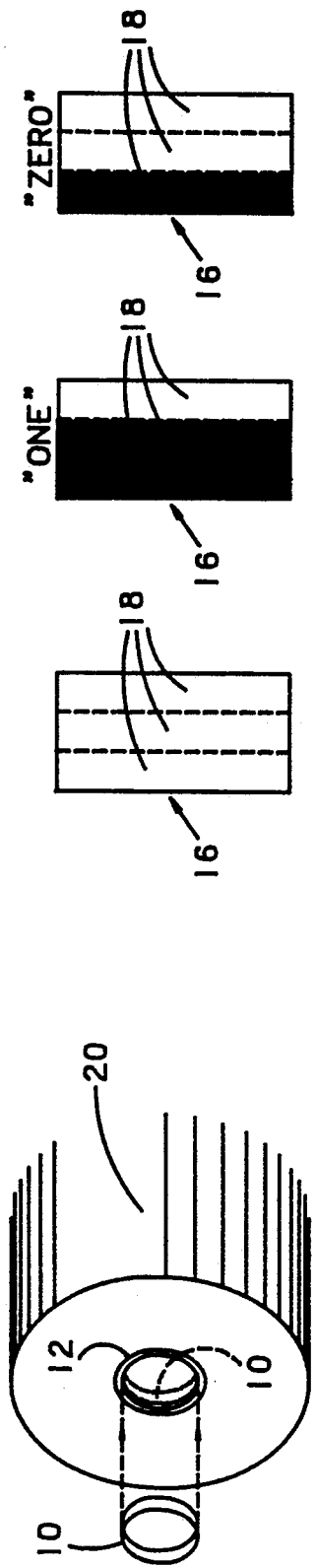
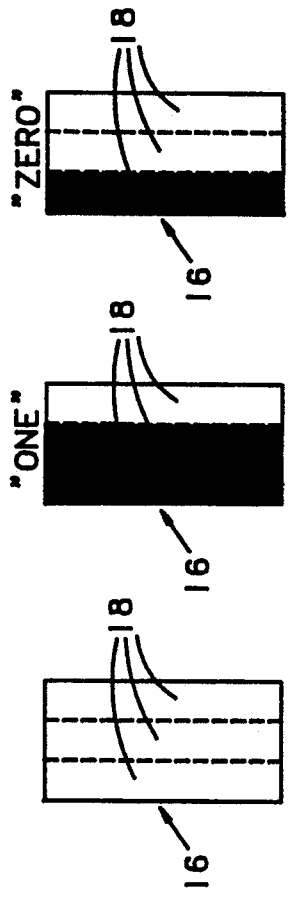
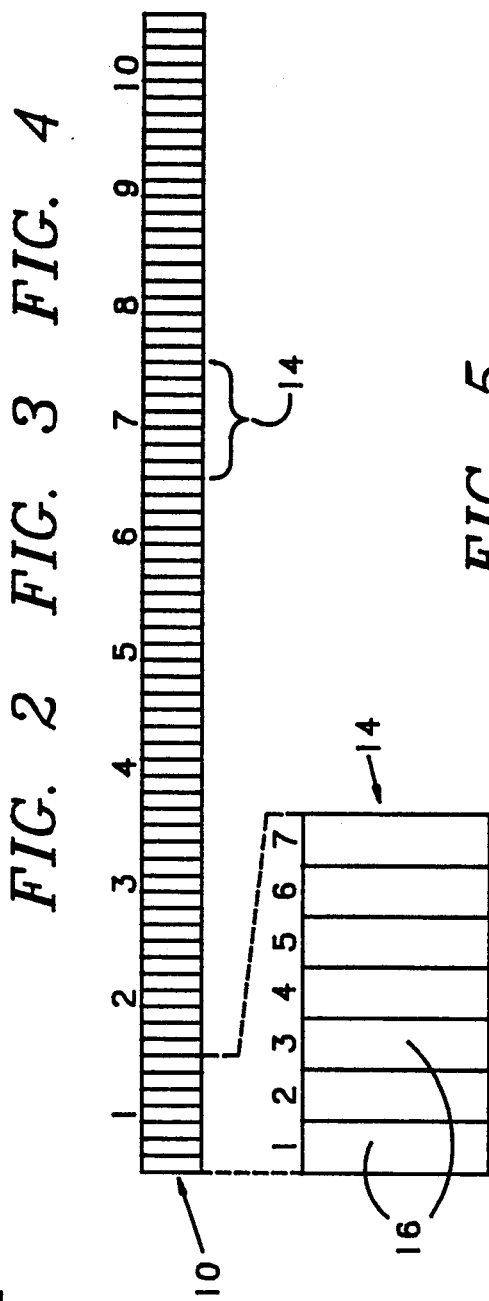
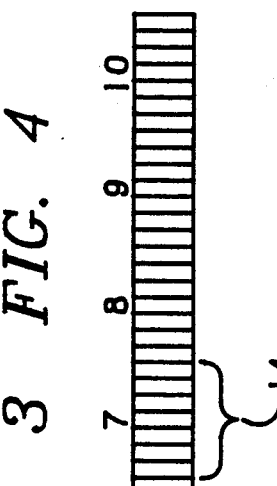
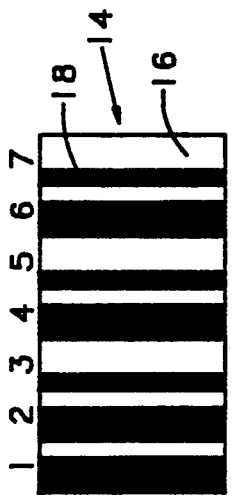

BAR CODING SCHEME FOR SENSING MEDIA TYPE AND QUANTITY ON A ROTATING SUPPLY TUBE

BACKGROUND OF THE INVENTION

The present invention relates to methods for automatically determining the type and amount of plotting media provided on a supply tube and, more particularly, to a scheme for determining the type and amount of plotting media on a hollowtubed media supply tube by using a barcode strip secured to the inner surface of a plotting media tube which is continuously optically scanned by an optical scanning probe inserted into the plotting media supply tube while the plotter is in operation.

Currently, methods for allowing a plotter to differentiate between different media types include: entering information into the plotter's driver software (within the computer to which the plotter is attached), entering information directly into the plotter via a plotter configuration menu, or adjusting the plotter's dip-switches. Knowing the type of plotting media presently in use allows the plotter to incorporate the particular media's thickness into a calculation to determine the amount of media remaining on the media supply tube. Present methods for determining the amount of media on a media supply tube include marking the borders of the last remnants of media with colored ink, or using the physical presence of the plotting media to restrain a mechanical sensor or block an optical light source within the plotter's media handling mechanism. These methods are only useful in determining when the media supply tube is empty and cannot be used to determine the amount still remaining. Simply using the rotational velocity of the supply tube without knowing the thickness of the particular media does not allow for precise quantity calculations, only rough estimates. Furthermore, knowing the media's identity allows the plotter to handle the media in a manner consistent with its particular characteristics. Delicate forms of plotting media may require careful handling and slower pen carriage speeds, while sturdy media can be handled vigorously. Some media types (such as transparencies whose smooth surface is easily marked) are conducive to high pen speeds.

The marking of containers containing different web media is known in the art. Film containers are a primary source of such prior art. For example, East German Patentschrift 51533 shows a film cartridge having a series of dot positions on the cartridge side portions which can be used to indicate the film speed. French 1451597 accomplishes the same result by placing the dot positions radially on the cartridge end. U.S. Pat. No. 3,490,348 replaces the dots of French 1451597 with mechanically sensible raised or indented radial arcs at various radii and/or positions to indicate the film attributes. U.S. Pat. No. 3,276,340 simply put positioned notches in the rim of the metal film cartridge for the same purpose.

More recently and of more pertinence to the present invention, Yamamoto in U.S. Pat. No. 4,920,376 provided a cartridge for a photosensitive recording medium in which information about the recording medium in the cartridge is printed in bar-code format on the outside of the cartridge.

In any web media, placing the media in a cartridge adds to the complexity of the using apparatus as well as the cost of the media. For example, in Yamamoto there must be space for the cartridge as well as optical apparatus for scanning the bar code.

In roll-fed plotters, it is desirable to simply provide the plotting media rolled on a cardboard supply tube. On the other hand, it is also desirable to be able to provide more detailed information about the media on the supply tube than can be encoded into notches or dots on the end of the cardboard tube.

Wherefore it is an object of this invention to provide a scheme for automatically determining the precise type and amount of plotting media on a particular plotting media supply tube loaded into a plotter.

It is another object of this invention to provide methods and apparatus for simply and efficiently marking a cardboard media supply tube with barcoded information and subsequently reading it at a time of use.

Other objects and benefits of the invention will become apparent from the detail description which follows hereinafter when taken in conjunction with the drawings and figures which accompany it.

SUMMARY

The foregoing objects have been achieved by the apparatus of the present invention for sensing media information about a strip of media wound about a media supply tube to form a roll comprising, a bar-coded identification strip containing encoded media information thereon affixed about an inner periphery of the media supply tube adjacent an end thereof; an optical scanning probe inserted into the end of the media supply tube with a reading portion adjacent the bar-coded identification strip; and, logic means for, as media is removed from the media supply tube thereby rotating the media supply tube, employing the optical scanning probe to scan the bar-coded identification strip as it revolves past the optical scanning probe and for deriving the encoded media information therefrom.

In the preferred embodiment, there are logic means for using the media information to set operating parameters of a device using the media. There are also logic means for using the media information to calculate the amount of media remaining on the media supply tube.

The preferred logic means for using the media information to calculate the amount of media remaining on the media supply tube includes logic for, using the speed of reading barcodes on the bar-coded identification strip to determine the instant rotational speed of the outer periphery of the media roll; using the instant rotational speed of the outer periphery of the media roll as compared to a known longitudinal rate of media removal from the media roll to determine the present diameter of the media roll; and, using the present diameter of the media roll as a function of the thickness of the media as contained in the media information to determine the present amount of media remaining on the media supply tube. There are also first alarming means for alarming a media low condition when the amount of media remaining on the media supply tube falls below a preestablished amount and second alarming means for alarming a media out condition when no rotational velocity of the media supply tube is sensed as media is withdrawn from the media supply tube.

In one embodiment, there are means for withdrawing the optical scanning probe from the end of the media supply tube to a retracted position while a roll of media is being replaced and means for inserting the optical scanning probe into the end of the media supply tube to a scanning position when a roll of media is being used.

Preferably, the bar-coded identification strip comprises a series of repeating barcode segments. Also, each segment of the series of repeating barcode segments is at a fixed spaced relationship to next adjacent other segments. In addition, each segment of the series of repeating barcode segments comprises a unique synchronization code in combination with a media information code.

DESCRIPTION OF THE DRAWINGS

FIG. 1 shows the way the bar-coded identification strip employed in the present invention is mounted on the inner surface of a media supply tube.

FIG. 2 depicts the three column format of a barcode digit according to the preferred bar-coded identification scheme of the present invention.

FIG. 3 depicts a "one" barcode digit according to the preferred bar-coded identification scheme of the present invention.

FIG. 4 depicts a "zero" barcode digit according to the preferred bar-coded identification scheme of the present invention.

FIG. 5 shows the bar-coded identification strip, giving greater details of the barcode segments.

FIG. 6 shows an example of a barcode segment for a plotting media identified by the hexidecimal digit "A" barcoded according to the preferred embodiment of the present invention.

DESCRIPTION OF THE PREFERRED EMBODIMENT

Figure 8:
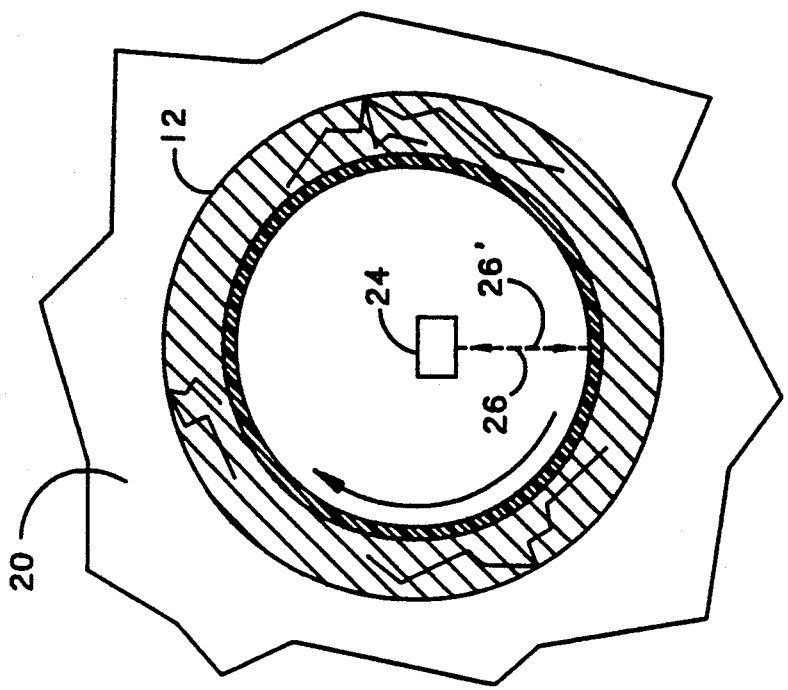
FIG. 8 is a cutaway end view through FIG. 7.

The preferred embodiment of the present invention will now be described with respect to implementation in a pen plotter. As those skilled in the art will recognize and appreciate, the novel aspects of the invention can be adapted to other types of plotting and printing apparatus wherein the media employed is fed from a roll. Accordingly, the breadth accorded the claims appended hereto is intended to reflect the scope and spirit of the invention being described herein and not be limited by the use of a specific example.

As depicted in FIGS. 1, 7, 8, and 11-14, to implement the present invention a barcode identification strip 10 is secured to the inner surface of the plotting media supply tube 12. Preferably, the barcode identification strip 10 is of preprinted plastic, or the like, with an adhesive backing for ease of attachment.

As depicted in FIG. 5, the preferred barcode identification strip 10 is comprised of ten contiguous repetitions of a plotting media identification segment 14. Each identification segment 14 is made up of seven bars 16. Each bar 16 is subdivided into three columns 18 as depicted in FIG. 2. The three columns 18 are filled in to represent "ones" and "zeroes" for the particular bar 16 in each segment 14 in the manner depicted in FIGS. 3 and 4. One column 18 is always left blank so as to provide an identifiable break between adjacent bars 16. If two columns 18 are filled as in FIG. 3, the bar 16 is a one. If only one column 18 is filled as in FIG. 4, the bar 16 is a zero. Since the barcode identification strip 10 in the preferred embodiments is read by an optical scanner employing reflective light, the term "filled" as the drawing figures are viewed can be interpreted as "reflective" and the term "blank" can be interpreted as "non-reflective".

Preferably, the first three bars 16 of each plotting media identification segment 14 represent a synchronization code while the remaining four bars 16 are a plotting media type identification code. In the preferred embodiment, the synchronization code is represented by barcode "110". Therefore, each segment 14 would read: 110XXXX, where XXXX is the plotting media the identification code. In order to retain the uniqueness of the particular synchronization code, the subsequent four-bar media type identification code cannot contain the synchronization code sequence in the same order (i.e. cannot contain "110"). Therefore, the number of media types identifiable is limited to the twelve of the sixteen possible types identifiable by a four digit barcode sequence which do not contain the 110 sequence. Hence, in the preferred embodiment the 110 sequence cannot be repeated in the media type identification code leaving the configurations of Table I as those available. As those skilled in the art will recognize and appreciate, other synchronization codes could be employed and the number of bars 16 in each segment 14 could be changed to implement more or fewer media type identification codes. Also, more or fewer segments 14 repeating the coding sequence for a particular roll of plotting media could be employed.

TABLE I

| Media Type # | HEX | Code Sequence Sync Code\|Type ID |
|---|---|---|
| 1 | 0 | 110\|0000 |
| 2 | 1 | 110\|0001 |
| 3 | 2 | 110\|0010 |
| 4 | 3 | 110\|0011 |
| 5 | 4 | 110\|0100 |
| 6 | 5 | 110\|0101 |
| 7 | 7 | 110\|0111 |
| 8 | 8 | 110\|1000 |
| 9 | 9 | 110\|1001 |
| 10 | A | 110\|1010 |
| 11 | B | 110\|1011 |
| 12 | F | 110\|1111 |

As Table I demonstrates, the synchronization code "110" does not appear in the media type identification code segment thereby retaining its uniqueness. FIG. 6 shows how one segment 14 would appear for media type 1.0 from Table I with the synchronization code 110 and binary 1010 (i.e. hexadecimal A).

Figure 7:
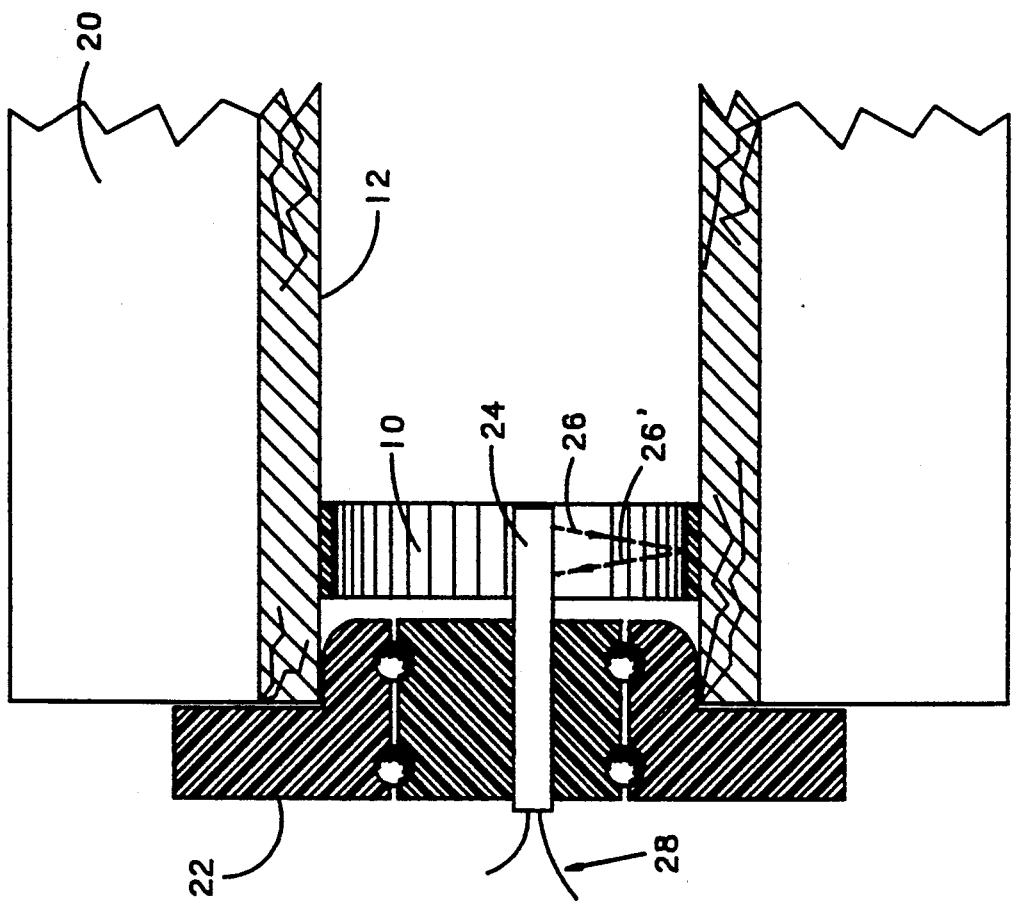
FIG. 7 is a cutaway view through one end of a media supply tube mounted on a supporting hub with the bar-coded identification strip being read according to a first embodiment of the present invention.

A first embodiment for implementing a system employing the barcode identification strip 10 is depicted in FIGS. 7 and 8. In this embodiment, the media supply tube 12 having the media 20 rolled thereon is mounted on a pair of rotating hubs 22 at opposite ends of the tube 12. One of the hubs 22 as depicted in FIG. 7 has an optical scanner 24 mounted therewith. The optical scanner 24 is of a type well known in the art which contains a source (not shown) of a beam of light 26 which is directed onto the barcode identification strip 1.0. As the tube 12 revolves during consumption of the media 20, the beam of light 26 strikes the barcode identification strip 10 from which it is reflected as light 26' by the reflective portions of the barcode identification strip 10. The optical scanner 24 also contains a photodetector (not shown) which develops an electrical signal on wires 28 as a function of light 26' striking the photodetector.

Figure 9:
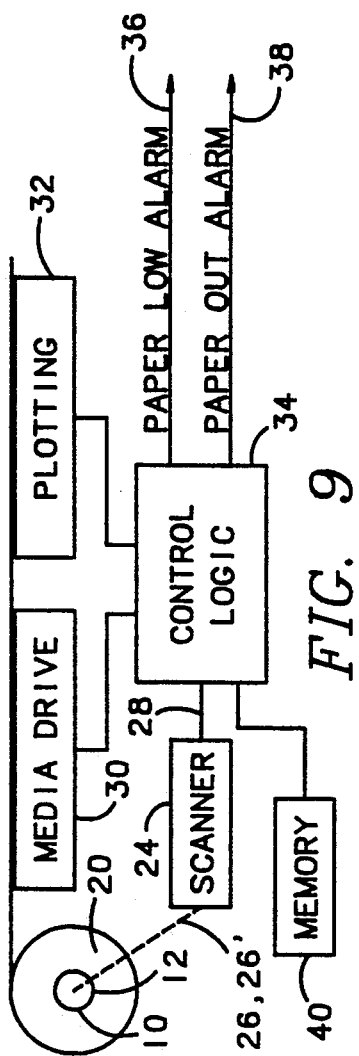
FIG. 9 is a partial functional block diagram of a plotter employing the present invention.

As depicted in FIG. 9, as the media drive 30 removes media 20 from the tube 12 and moves it to the plotting area 32, the signal from the scanner 24 on wires 28 is input to the control logic 34. In one possible approach to employing the above-described embodiment of the barcode identification strip 10, the contiguous identifier segments 14 which make up the barcode identification strip 10 are in a known spaced relationship to one another. Measuring the time between leading edges of the barcode elements or segments, and knowing the inner diameter of the media supply tube 12, the rotational velocity of the media supply tube 12 can be calculated. Then, comparing the rotational rate of the media supply to the media platen drive rotational rate gives a ratio of the diameter of the media supply tube 12 to the platen drive. Using this ratio, the diameter of the media supply tube 12 can be calculated using simple and well known mathematical techniques. Knowing the diameter of the media supply tube 12 and the media thickness, another simple and straightforward calculation by the logic 34 will give the amount of media 20 remaining on the supply tube 12, which can be employed to output a paper low alarm on line 36. Likewise, when the platen drive is actuated to draw media from the supply tube and no barcode transitions are sensed by the optical sensor 24, a media supply out alarm can be given on line 38. This particular approach has the advantage that tubes 12 of media 20 can be inserted and be removed at will with the system being able to determine the amount of media 20 remaining on each tube 12 when it is inserted for use.

Figure 10:
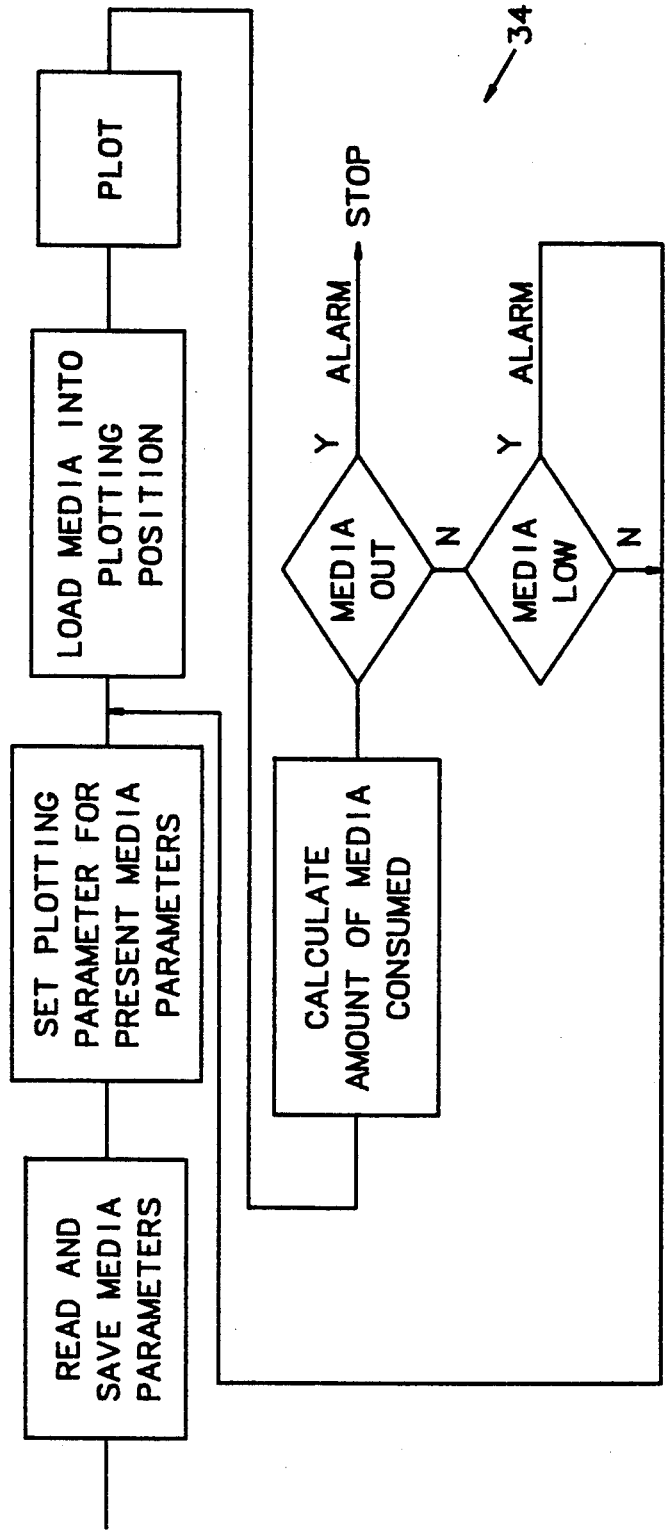
FIG. 10 is a flow chart of logic according to the present invention which can be employed in the plotter of FIG. 9.

A possible approach to the control logic 34 is shown in FIG. 10. When plotting is first started with a roll of media 20, the logic 34 reads the barcode identification strip 10 and saves the media parameters as in the memory 40 of FIG. 9. The media parameters for the particular media 20 on the tube 12 are then used to set the plotting parameters such as the plotting speed which are media-dependent, as discussed under the Background of the Invention portion hereof. An appropriate portion of the media 20 is then loaded into the plotting area 32 and plotting thereon takes place. The logic 34 then calculates the amount of media consumed. This can be in the manner described above in which the amount of media 20 still on the tube 12 is first determined. As an alternative, if each tube 12 of media 20 is to be consumed before replacement, the amount of media 20 initially on the tube 1.2 by media type can be pre-stored in the memory 40. Thus, when a known amount is moved to the plotting area 32, the amount remaining will be known. In either approach, the logic 34 first asks if the media 20 is now out. If it is, a paper out alarm is given and the logic stops the plotting process until additional media 20 is loaded. If media 20 still remains, the logic 34 then asks if the media is low according to predetermined -standards. If it is, a media low alarm is given before the plotting process continues. Note that since the amount of media 20 on the tube 12 is calculated as opposed to being mechanically or optically sensed, it is also a simple matter to provide notifications at various low paper levels.

Figure 14:
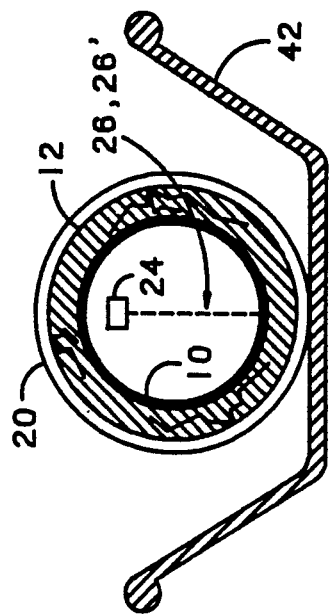
FIG. 14 is a cutaway end view of the apparatus of FIG. 11 when there is a near empty roll of plotting media.
Figure 13:
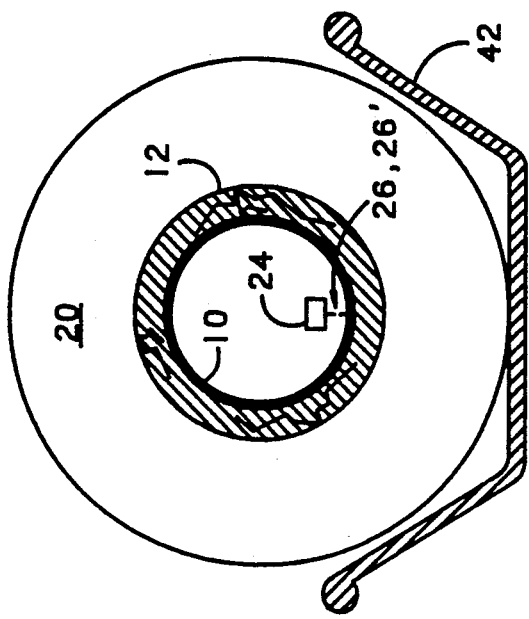
FIG. 13 is a cutaway end view of the apparatus of FIG. 11 when there is a full roll of plotting media.
Figure 12:
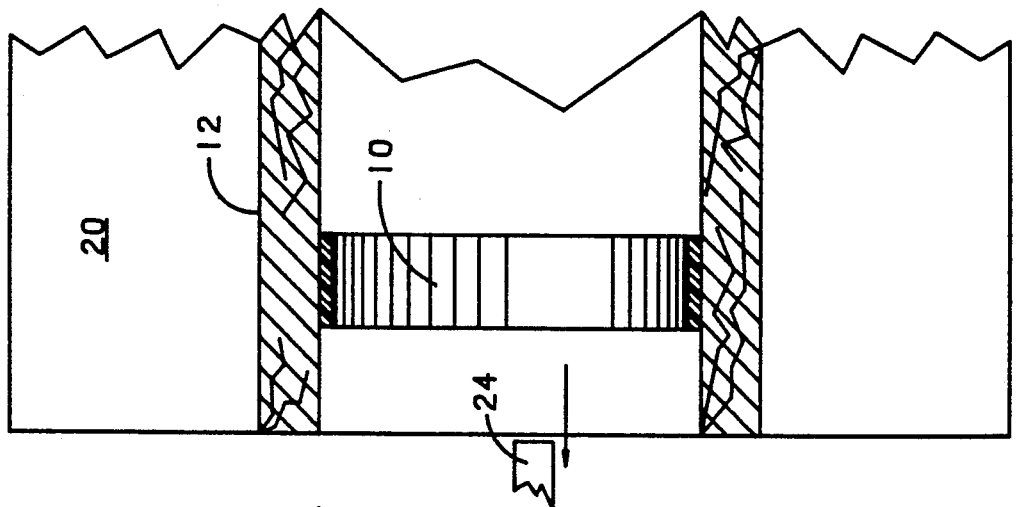
FIG. 12 shows the apparatus of FIG. 11 with the optical reader withdrawn for inserting or removing a roll of plotter media.
Figure 11:
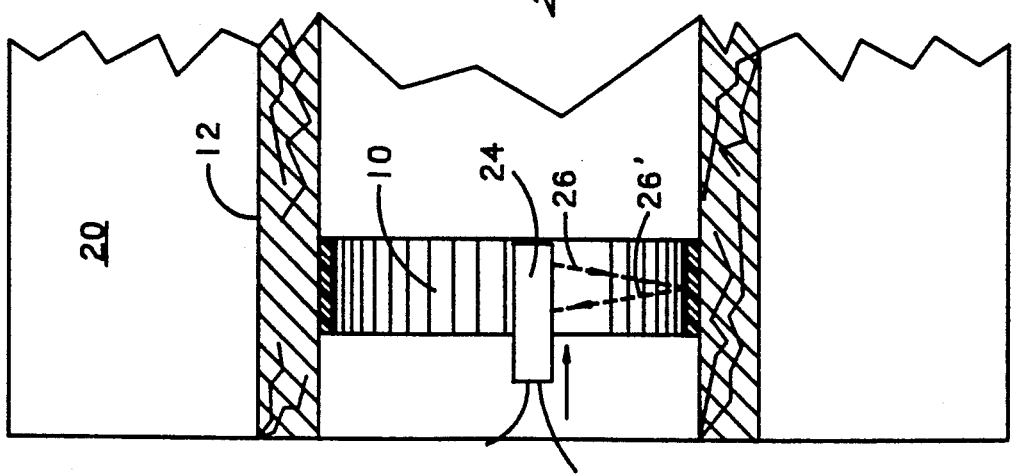
FIG. 11 is a cutaway view through one end of a media supply tube supported in a supply tray with the bar-coded identification strip being read by an optical reader according to a second embodiment of the present invention.

An alternate approach to the hub-supported roll-mounting system of FIGS. 7 and 8 is depicted in FIGS. 11-14. In many roll-fed devices, it is preferred to simply drop the roll of media 20 into a holding tray 42 as depicted in FIGS. 13 and 14. In such devices, there is usually a protective cover or lid (not shown) which must be lifted to load and/or unload the roll of media 20 from the device. The embodiment of FIGS. 7 and 8 in its preferred form takes advantage of this fact. As depicted in FIGS. 11 and 12, the optical scanner 24 is mounted for movement between the inserted or reading position of FIG. 11 and the retracted or loading/unloading position of FIG. 12. To load and/or unload a roll of media 20, the optical scanner 24 is moved to the retracted position of FIG. 12. Once the roll of media 20 is in place, the optical scanner 24 is moved to the inserted position of FIG. 11. Note that in the inserted position the optical scanner 24 is positioned to read the barcode identification strip 10 as in the prior embodiment. The optical scanner 24 can, of course, be moved manually between the two positions. It is preferred however, that a linkage be provided between the optical scanner and the cover/lid so that the optical scanner 24 automatically retracts when the cover/lid is raised and moves back to its inserted position when the cover/lid is lowered. Such linkages are well known to those skilled in the art and form no portion of the novelty of the present invention, per se.

As depicted in FIGS. 13 and 14, however, the optical scanner 24 should be positioned vertically within the tube 12 and with respect to the bottom of the tray 42 such that there is no interference between the optical scanner 24 and the tube 12 (and barcode identification strip 10 therein) as the tube 12 drops during consumption of the surrounding media 20.

As those of ordinary skill in the art will recognize and appreciate from the descriptions above taken in conjunction with the descriptive drawing figures which accompany them, both of the foregoing embodiments provide for the automatic scanning of the barcode contained on the barcode identification strip 10 without any complicated scanning apparatus.

Wherefore having thus described the present invention, what is claimed is:

1. A method of sensing media information about a strip of media wound about a media supply tube to form a roll comprising the steps of:
 a) affixing a bar-coded identification strip containing encoded media information thereon about an inner periphery of the media supply tube adjacent an end thereof;
 b) inserting an optical scanning probe into the end of the media supply tube with a reading portion adjacent the bar-coded identification strip; and,
 c) as media is removed from the media supply tube thereby rotating the media supply tube, scanning the bar-coded identification strip as it revolves past the optical scanning probe to derive the encoded media information therefrom.

2. The method of sensing media information about a strip of media wound about a media supply tube of claim 1 wherein the media information comprises information about the type of media and additionally comprising the step of:

using the media information to set operating parameters of a device using the media.

3. The method of sensing media information about a strip of media wound about a media supply tube of claim 1 wherein the media information comprises information about the type of media and additionally comprising the step of:

using the media information to calculate the amount of media remaining on the media supply tube.

4. The method of sensing media information about a strip of media wound about a media supply tube of claim 3 wherein said step of using the media information to calculate the amount of media remaining on the media supply tube comprises the steps of:

a) using the speed of reading barcodes on the bar-coded identification strip to determine the instant rotational speed of the outer periphery of the media roll;

b) using the instant rotational speed of the outer periphery of the media roll as compared to a known longitudinal rate of media removal from the media roll to determine the present diameter of the media roll; and, c) using the present diameter of the media roll as a function of the thickness of the media as contained in the media information to determine the present amount of media remaining on the media supply tube.

5. The method of sensing media information about a strip of media wound about a media supply tube of claim 4 and additionally comprising the step of:

alarming a media low condition when the amount of media remaining on the media supply tube falls below a pre-established amount.

6. The method of sensing media information about a strip of media wound about a media supply tube of claim 4 and additionally comprising the step of:

alarming a media out condition when no rotational velocity of the media supply tube is sensed as media is withdrawn from the media supply tube.

7. The method of sensing media information about a strip of media wound about a media supply tube of claim 1 and additionally comprising the steps of:

a) withdrawing the optical scanning probe from the end of the media supply tube to a retracted position while a roll of media is being replaced; and, b) inserting the optical scanning probe into the end of the media supply tube to a scanning position when a roll of media is being used.

8. Apparatus for sensing media information about a strip of media wound about a media supply tube to form a roll comprising:

a) a bar-coded identification strip containing encoded media information thereon affixed about an inner periphery of the media supply tube adjacent an end thereof;

b) an optical scanning probe inserted into the end of the media supply tube with a reading portion adjacent said bar-coded identification strip; and, c) logic means for, as media is removed from the media supply tube thereby rotating the media supply tube, employing said optical scanning probe to scan said bar-coded identification strip as it revolves past said optical scanning probe and for deriving the encoded media information therefrom.

9. The apparatus for sensing media information about a strip of media wound about a media supply tube of claim 8 wherein the media information comprises information about the type of media and additionally comprising:

logic means for using the media information to set operating parameters of a device using the media.

10. The apparatus for sensing media information about a strip of media wound about a media supply tube of claim 8 wherein the media information comprises information about the type of media and additionally comprising:

logic means for using the media information to calculate the amount of media remaining on the media supply tube.

11. The apparatus for sensing media information about a strip of media wound about a media supply tube of claim 10 wherein said logic means for using the media information to calculate the amount of media remaining on the media supply tube includes logic for-.

a) using the speed of reading barcodes on said bar-coded identification strip to determine the instant rotational speed of the outer periphery of the media roll;

b) using the instant rotational speed of the outer periphery of the media roll as compared to a known longitudinal rate of media removal from the media roll to determine the present diameter of the media roll; and, c) using the present diameter of the media roll as a function of the thickness of the media as contained in the media information to determine the present amount of media remaining on the media supply tube.

12. The apparatus for sensing media information about a strip of media wound about a media supply tube of claim 11 and additionally comprising:

first alarming means for alarming a media low condition when the amount of media remaining on the media supply tube falls below a preestablished amount.

13. The apparatus for sensing media information about a strip of media wound about a media supply tube of claim 11 and-additionally comprising:

second alarming means for alarming a media out condition when no rotational velocity of the media supply tube is sensed as media is withdrawn from the media supply tube.

14. The apparatus for sensing media information about a strip of media wound about a media supply tube of claim 8 and additionally comprising:

a) means for withdrawing said optical scanning probe from the end of the media supply tube to a retracted position while a roll of media is being replaced; and, b) means for inserting said optical scanning probe into the end of the media supply tube to a scanning position when a roll of media is being used.

15. The apparatus for sensing media information about strip of media wound about a media supply tube of claim 8 wherein:

said bar-coded identification strip comprises a series of repeating barcode segments.

16. The apparatus for sensing media information about a strip of media wound about a media supply tube of claim 15 wherein:

each segment of said series of repeating barcode segments is at a fixed spaced relationship to next adjacent other segments.

17. The apparatus for sensing media information about a strip of media wound about a media supply tube of claim 15 wherein:

each segment of said series of repeating barcode segments comprises a unique synchronization code in combination with a media information code.

18. In a plotting device employing a strip of media wound about a media supply tube to form a media supply roll, the improvement for sensing and employing media information comprising:

a) a bar-coded identification strip containing encoded media information thereon affixed about an inner periphery of the media supply tube adjacent an end thereof;

b) an optical scanning probe inserted into the end of the media supply tube with a reading portion adjacent said bar-coded identification strip; and, c) logic means for, as media is removed from the media supply tube thereby rotating the media supply tube, employing said optical scanning probe to scan said bar-coded identification strip as it revolves past said optical scanning probe and for deriving the encoded media information therefrom.

19. The improvement of claim 18 wherein the media information comprises information about the type of media and additionally comprising:

logic means for using the media information to set operating parameters of the device.

20. The improvement of claim 18 wherein the media information comprises information about the type of media and additionally comprising:

logic means for using the media information to calculate the amount of media remaining on the media supply tube.

21. The improvement of claim 20 wherein said logic means for using the media information to calculate the amount of media remaining on the media supply tube includes logic for:

a) using the speed of reading barcodes on said bar-coded identification strip to determine the instant rotational speed of the outer periphery of the media roll;

b) using the instant rotational speed of the outer periphery of the media roll as compared to a known longitudinal rate of media removal from the media roll by the device to determine the present diameter of the media roll; and, c) using the present diameter of the media roll as a function of the thickness of the media as contained in the media information to determine the present amount of media remaining on the media supply tube.

22. The improvement of claim 21 and additionally comprising:

first alarming means for alarming a media low condition in the device when the amount of media remaining on the media s ply tube falls below a preestablished amount.

23. The improvement of claim 21 and additionally comprising:

second alarming means for alarming a media out condition in the device when no rotational velocity of the media supply tube is sensed as media is withdrawn from the media supply tube.

24. The improvement of claim 18 and additionally comprising:

a) means for withdrawing said optical scanning probe from the end of the media supply tube to a retracted position while a roll of media is being replaced in the device; and, b) means for inserting said optical scanning probe into the end of the media supply tube to a scanning position when a roll of media is being used by the device.

25. The improvement of claim 18 wherein:

said bar-coded identification strip comprises a series of repeating barcode segments.

26. The improvement of claim 25 wherein:

each segment of said series of repeating barcode segments is at a fixed spaced relationship to next adjacent other segments.

27. The improvement of claim 25 wherein:

each segment of said series of repeating barcode segments comprises a unique synchronization code in combination with a media information code.

* * * * *